United States Patent [19]

Legrand et al.

[11] 4,346,861

[45] Aug. 31, 1982

[54] APPARATUS FOR HANGING A PROPULSION UNIT ON AN AIRCRAFT CELL, TOOLING AND PROCESS FOR USING SAME

[75] Inventors: Paul J. Legrand, Vaux le Penil; Michel L. Dubeau, Dammarie les Lys; Guy R. Pachomoff, Corbeil-Essonnes, all of France

[73] Assignee: Societe Nationale d'Etude et de Construction de Moteurs d'Aviation, "S.N.E.C.M.A.", Paris, France

[21] Appl. No.: 137,916

[22] Filed: Apr. 7, 1980

[30] Foreign Application Priority Data

Apr. 9, 1979 [FR] France .................................. 79 09396

[51] Int. Cl.³ ........................ B64D 27/00; B64D 29/00
[52] U.S. Cl. .................................. 244/54; 29/526 R; 60/39.31; 248/554; 403/19
[58] Field of Search .............. 244/53 R, 54; 60/39.31; 403/19, 20, 22, 342, 343; 29/526 R; 248/544, 545, 554

[56] References Cited

U.S. PATENT DOCUMENTS

| 2,815,184 | 12/1957 | Westphal et al. ...................... 244/54 |
| 3,592,421 | 7/1971 | Kopp ..................................... 248/554 |

FOREIGN PATENT DOCUMENTS

| 1176952 | 4/1959 | France ................................. 244/54 |
| 2326327 | 4/1977 | France ................................. 244/54 |
| 866018 | 4/1961 | United Kingdom .................. 244/54 |

*Primary Examiner*—Galen L. Barefoot
*Attorney, Agent, or Firm*—Oblon, Fisher, Spivak, McClelland & Maier

[57] ABSTRACT

The apparatus for suspending a jet engine is composed of three assemblies: an assembly 1 of parts placed permanently on the engine, an assembly 3 of parts placed permanently on the cell, and a liaison assembly 5 for connection of the preceding parts. Assembly 3 placed on the cell is disposed at the bottom of a recess and the parts forming the liaison assembly are put into place across the recess and the assembly on the cell using tooling consisting of a guide tube and two spanners, the ends of which cooperate with the ends of the pieces of the liaison assembly. The invention also concerns a process and tooling for using the apparatus.

8 Claims, 4 Drawing Figures

APPARATUS FOR HANGING A PROPULSION UNIT ON AN AIRCRAFT CELL, TOOLING AND PROCESS FOR USING SAME

BACKGROUND OF THE INVENTION

1. Field of the Invention

The invention is related to an apparatus for hanging an engine propulsion unit upon an aircraft cell, enabling the setting of an engine attachment through a small recess provided in the cell. The invention is further related to tooling and a process of installing the apparatus.

2. Description of the Prior Art

French Pat. No. 2,326,327 provides an example of an apparatus for hanging an engine propulsion unit. Suspension from the cell is carried out in part by a central bolt and by lateral control links. The bolt transmits transverse thrust forces to the cell and permits vertical movements between the engine propulsion unit and the cell, while the links ensure the suspension of the unit from the cell. The bolt further serves as a centering element for the unit during the setting phase of assembly. At the end cooperating with the engine unit, the hollow bolt holds an anchoring element which is free to slide along the axis of the bolt and is threaded inside of the bolt. Upon assembly, a hoisting bar is introduced into the bolt and is screwed at one end into the anchoring element. At the other end is attached a hoisting cable connected to a winch. When the control links are attached, the hoisting wire and the bar are disassembled, freeing the anchoring element and enabling transverse displacements of the group with respect to the cell.

With this apparatus, centering and suspension are obtained using different elements. Access to bolt necessitates an inspection door and an access hole adequately sized to enable passage of assembly tools and the hoisting cable. However, in military aircraft, the need to increase fuel reserves to the greatest extent possible requires the use of the least possible area within the cell.

SUMMARY OF THE INVENTION

The invention proposes the construction of a suspension apparatus of original design enabling reduction of inspection doors and access holes through use of a special tooling as well as an assembly process enabling "blind" access to the attachment system.

BRIEF DESCRIPTION OF THE DRAWINGS

Various other objects, features and attendant advantages of the present invention will be more fully appreciated as the same becomes better understood from the following detailed description taken considered in connection with the accompanying drawings in which like reference characters designate like or corresponding parts throughout the several views, and wherein.

DETAILED DESCRIPTION OF THE PREFERRED EMBODIMENTS

The engine propulsion unit in the described embodiment comprises a forward main suspension and a rear auxiliary suspension.

Figure 1:
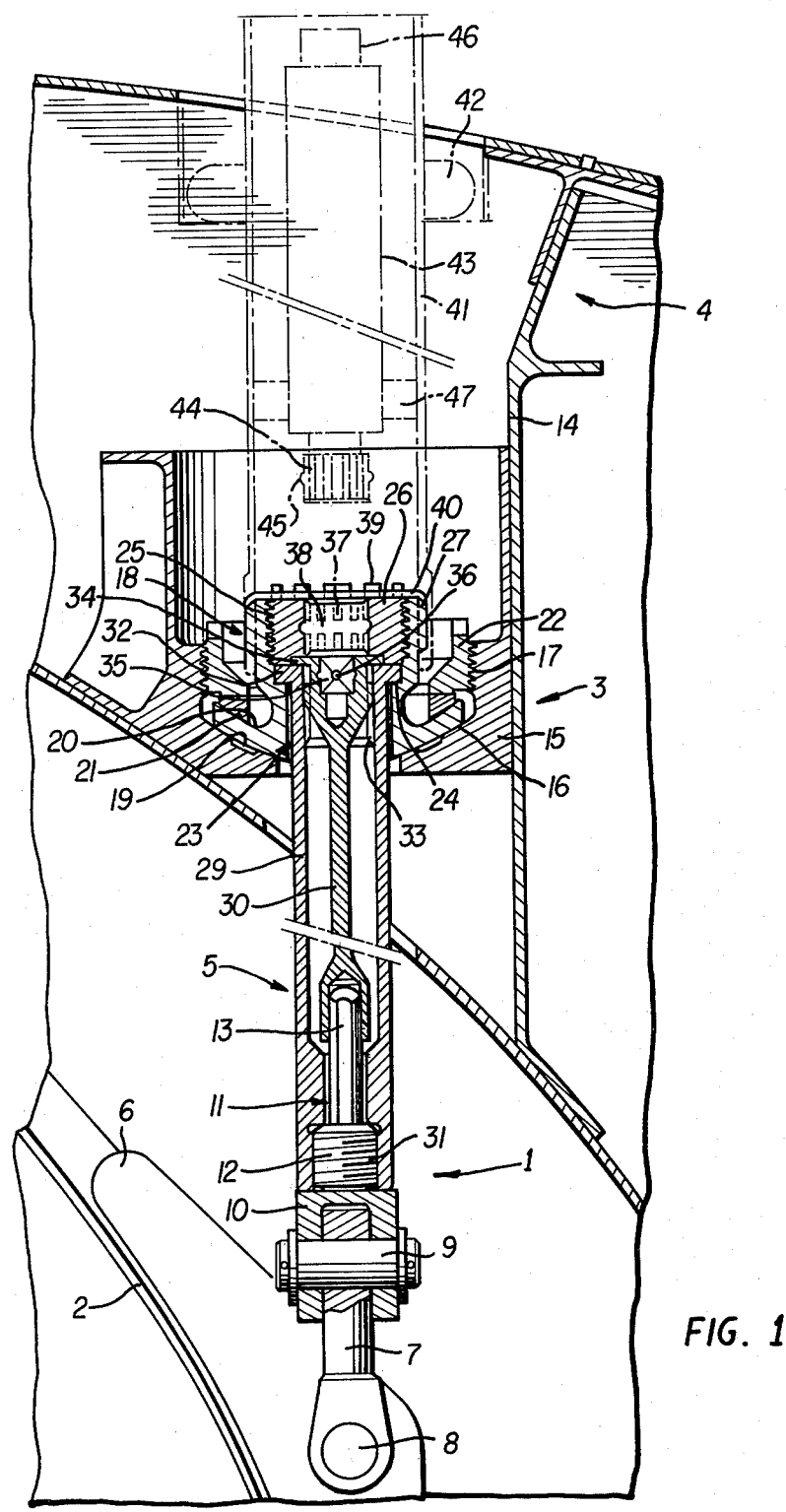
FIG. 1 shows the assembled suspension apparatus.

The suspension apparatus of the invention shown in FIG. 1 enables the setting of the auxiliary attachment of an engine to an aircraft cell.

This apparatus is composed of three assemblies: an assembly 1 mounted permanently on the housing of engine 2; a second assembly 3 mounted permanently on cell 4 of the aircraft; and a third "liaison" assembly 5 connecting assemblies 1 and 3. The assemblies mounted permanently on the housing and cell both include an articulation so as to enable their mutual orientation during mounting of the liaison assembly.

Figure 2:
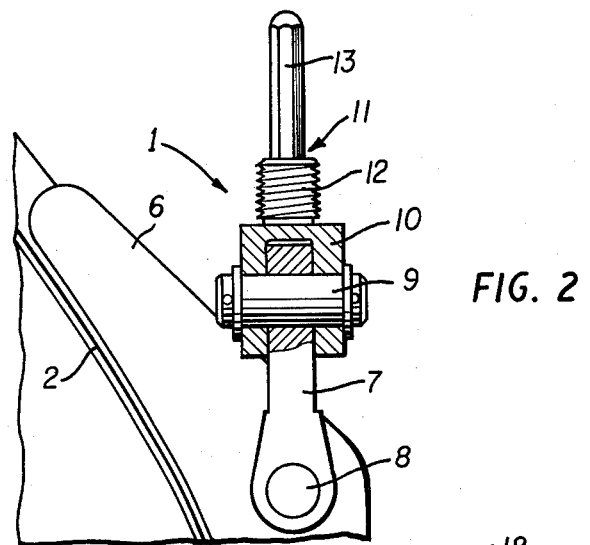
FIG. 2 represents the assembly permanently attached to an engine.

Assembly 1 (FIG. 2) is mounted on a yoke 6 integral with engine housing 2 and is constituted, in the embodiment represented, by a link 7 articulated on axis 8 supported by the yoke. The other end of the link is articulated at axis 9 in yoke 10. This yoke is prolonged by shaft 11, of which the part closest to the yoke contains threading 12 and free part 13 having rotational blocking means, e.g., a hexagon.

The assembly forms a universal joint. A spring (not shown) maintains this assembly in such a position that introduction operations between engine parts and cell parts are facilitated.

Figure 3:
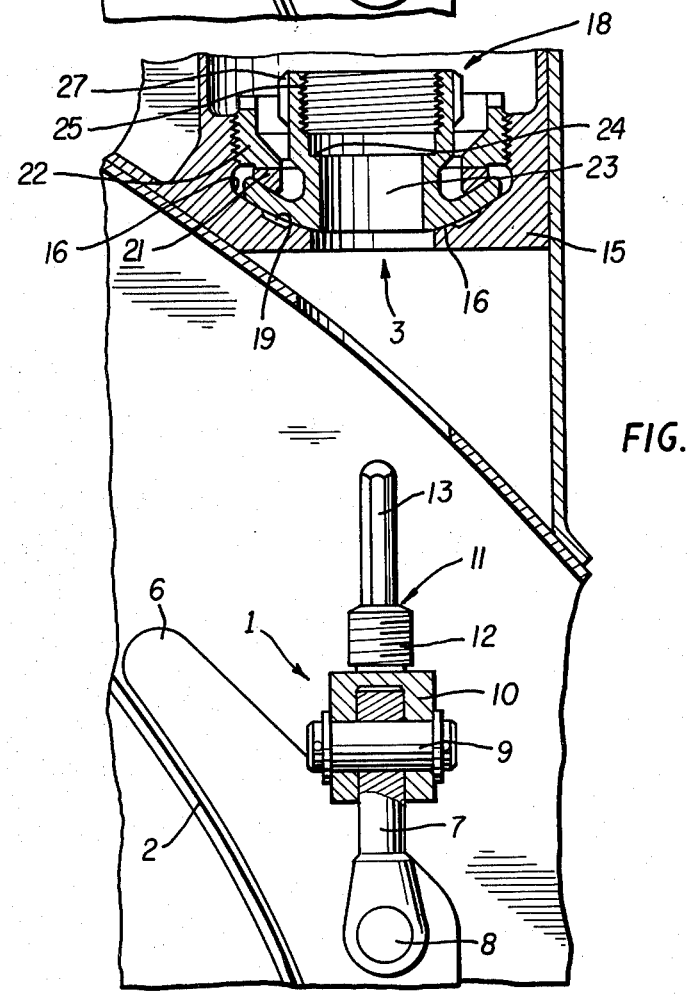
FIGS. 3 and 4 represent phases of assembly of the apparatus.

Assembly 3 (FIGS. 1 and 3) is disposed at the bottom of a recess 14 provided in the cell and is composed of: a first element 15, integral with the cell and defining a spherical, concave bearing surface 16 at the bottom of a cylindrical bore, one part 17 of which is threaded, and a second element 18 defining a revolving part, at one end of which are provided two spherical bearing surfaces, one convex 19 and one concave 20. Bearing surface 19 comes to rest on spherical bearing surface 16. Bearing surface 20 receives a spherical-cylindrical retaining ring 21 held by a threaded ring 22, which is tightened down by cooperation with the threaded part 17 of the first element 15 in such a way as to regulate the stiffness of the articulation formed by bearing surfaces 16 and 19.

Along its axis of symmetry, part 18 contains a passage 23 constituting at least part of the attachment means for the liaison assembly. This axial passage has three bores of different diameters; two of the bores form a flat bearing surface 24 intended to support an element of the liaison assembly 5, while the third bore 25 has threads intended for locking element 26 which forms part of the liaison assembly. Part 18 has, at its periphery and in the area corresponding approximately to bore 25, splines 27 enabling immobilization of the articulation when the liaison assembly is put into place.

Liaison assembly 5 (FIGS. 1 and 4) comprises two parts 29 and 30 which are at least partially cylindrical and coaxial. A first liaison part 29 has the approximate form of a tube with a threaded bore 31 at one end, intended to cooperate with threaded shaft piece 12 of assembly 1, followed by a bore of sufficient diameter to permit free passage of shaft piece 13. The other end has a flange 32 shaped so as to lodge within the bore and upon flat bearing surface 24 of element 18 of assembly 3, and further has interior longitudinal splines 33.

A second "locking" part 30 has at one end means 113 (FIG. 4) capable of cooperating with the surfaces of shaft 13 (according to the embodiment, a hollow hexagon). At the other end, at its periphery, it has longitudinal splines 133 cooperating with splines 33 of liaison piece 29, a flange 34 capable of resting on flange 32 of liaison piece 29, and a coaxial recess 35 which, according to one embodiment, is formed by a hollow square in which further recesses 36 are provided for receiving the retaining balls of a tool element.

A locking element 26 (FIG. 1) forms a nut, threaded at its outside and cooperating with the threads of bore 25 of element 18. This element contains a central passage having means 37 for engaging and 38 for retaining a tool part. According to one embodiment, the engaging means 37 are composed of splines, and the retaining means 38 of a circular groove in which will be seated the locking balls of the tool part. Element 26 further contains, on one of its parallel surfaces, a hollow in which flange 34 of locking element 30 is seated and, on the other surface, slits 39 which enable locking of the nut by an elastic element 40 entering the splines of element 18.

Figure 4:
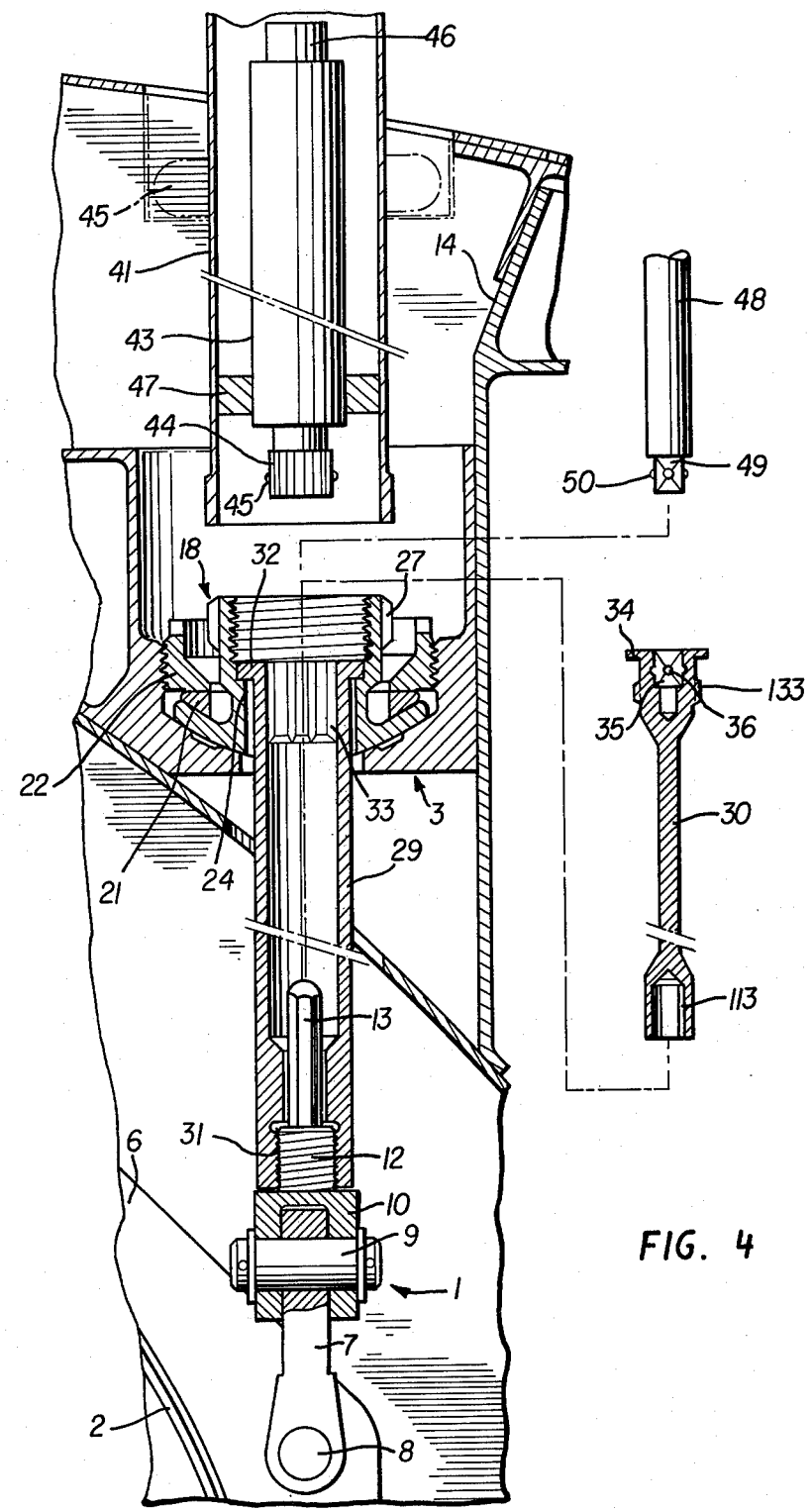

FIG. 1 shows in dashes one part of the tooling intended for putting the apparatus into use. The complete tooling is shown in FIG. 4 and comprises a guide tube 41 introduced into recess 14 and engaging splines 27 of element 18, it is itself held in place within the recess by guides 42. A first spanner 43 having at one end splines 44 and retaining balls 45 intended to engage within the splines and recesses of liaison tube 29 and locking element 26 for their introduction and installation, and, at the other end, a square drive 46; this spanner also possesses centering tabs 47 for automatic positioning of the driven parts. A second spanner is at 48, one end of which comprises a square drive 49 with locking balls 50. This spanner is intended for the setting of locking element 30 and cooperates with recess 35 and further recesses 36.

The process for putting into operation the suspension apparatus and tooling according to the above description will be described in the following.

The engine is equipped with rollers and brought on guide rails into position under suspension apparatus 3 of the cell. Assemblies 1, affixed to the engine, are held in the desired position by springs.

Guide tube 41 is introduced into recess 14 of the cell so as to engage splines 27 of piece 18. The tube may possibly be fixed at the portion remaining outside the recess in order to avoid any rotation of the tube or ball-and-socket element. At the end of spanner 43 is placed liaison piece 29, the internal splines 33 and the ball recesses of which cooperate with splines 44 and balls 45 of the spanner. The assembly is introduced into the guide tube in such a way that the liaison piece passes through the axial passage of the ball-and socket. When threaded end 31 of piece 29 catches thread 12 of shaft 11, the end of piece 29 is screwed down until it contacts yoke 10. During tightening, the engine is raised and the rollers freed from the guide rails. Spanner 43 is then withdrawn. At the end of spanner 48 is placed locking piece 30 which is held there by the balls 45, and the assembly is introduced through the recess into the guide tube. Piece 30 enters the bore of liaison piece 29 and the hollow hexagonal end caps the end of shaft 13, while outer splines 133 of the other end mesh with the inner splines of the liaison piece. Upon setting of the locking piece, a slight twist is applied, entailing a limited rotation of the liaison piece in the direction of tightening, causing an "overtightening" which will maintain a play-free tightness and avoid deterioration of the threads due to jarring. Spanner 48 is then withdrawn.

At the end of the other spanner 43 is placed locking element 26, and the assembly is then introduced through the recess and the guide tube in such a way that the element engages threading 24 of piece 18. By tightening, flange 32 of liaison piece 29 is locked on flat bearing surface 24 of element 18. Spanner 43 is withdrawn, followed by guide tube 41, and elastic element 40 is placed between slits 39 and splines 27 in such a way as to block rotating element 26. Disassembly of the suspension apparatus takes place in the same fashion as assembly, performing the operations in reverse.

As the description has allowed one skilled in the art to understand, all operations upon the suspension apparatus are performed "blind" through a small recess provided in the cell using appropriate tooling. All liaison and blocking elements are introduced and set in place through this recess, which enables reduction of the dead spaces generally required for present attachments.

The apparatus according to the invention further enables the engine to be hoisted into place without auxiliary raising means. This raising capacity, while limited, is sufficient to separate the guide rails from the engine.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Apparatus for hanging an engine propulsion unit on an aircraft cell, enabling setting of an engine attachment through a small recess provided in the cell, consisting of only three assemblies: first and second assemblies permanently respectively fixed to the engine and cell, and a third liaison assembly comprising two at least partially cylindrical and coaxial parts connecting only said first and second assemblies, wherein said second assembly forms an articulation and said articulation of the second assembly includes an axial passage enabling at least partial introduction of said liaison assembly through said recess of said cell, whereby said engine is both suspended and centered by said third assembly.

2. The apparatus of claim 1 wherein said first assembly includes a shaft, one part of which is threaded and another part of which possesses rotational blocking means.

3. The apparatus of claim 2 wherein said second assembly comprises, at the bottom of said recess, a first element integral with said cell and including a concave, spherical bearing surface and an inner threaded portion, a second element comprising a revolving part, at one end of which are provided two spherical bearing surfaces, one concave and one convex, traversed by said axial passage for passage of said third liaison element, a retaining ring positioned against said concave spherical bearing surface of the second element and held by means of said threaded portion of said first element, with said convex bearing surface of the second element cooperating with said concave bearing surface of the first element, the other end of said revolving part comprising within said axial passage at least part of the means for attachment of said third liaison assembly.

4. The apparatus of claim 3 wherein said axial passage contains three bores of said second element, two of which determine a flat bearing surface supporting an element of the liaison assembly, with the third bore in said second element containing interior threading intended for a locking element forming part of said liaison assembly, said third bore further having splines on its outer portion so that it can be held by means of a tool.

5. The apparatus of claim 4 wherein said two at least partially cylindrical and coaxial parts of said liaison assembly comprise:
- a first at least partially hollow part, having two coaxial bores at one end, a first inner-threaded bore adapted to cooperate with the threaded portion of the shaft of said first assembly, a second bore enabling free passage of the portion of the shaft having said rotational blocking means, said first part further having, at the other end, a flange cooperating with said flat bearing surface of said axial passage, said flange having interior, longitudinal splines;
- a second part having at one end means adapted to cooperate with said rotational blocking means, and at the other end a flange adapted to cooperate with the upper part of said flange of said first part as well as external grooves cooperating with said grooves of said first part and an interior recess adapted for receiving a tool element;
- further comprising a locking element, cooperating with said inner threading of the second element of said second assembly, said locking element containing a bore having means for engaging and retaining a tool part and means for rotational blocking, wherein said flange of said second part is positioned between said flange of said first part and said locking element.

6. The apparatus of claim 5 wherein said rotational blocking means of said locking element consists of slits in the free surface of said locking element, an elastic element and splines provided on the outer portion of the second embodiment of said second assembly.

7. The apparatus of claim 5 further comprising tool means for connecting said assemblies, said tool means including:
- a guide tube adapted to be introduced into said recess, one end of said guide tube cooperates with said splines provided on the outer portion of the second element of said second assembly;
- a first spanner comprising at one end, splines and said elastic retaining means adapted to cooperate with said locking element and with the splines of said first part of said liaison assembly, said first spanner having at the other end, drive means; and
- a second spanner, one end of which comprises a projection corresponding to said recess of said part of said liaison assembly and intended for introducing and setting said second part in place, and the other end of which comprises drive means.

8. A process for hanging an engine propulsion unit on an aircraft cell through a small recess in said cell, by means of first and second assemblies respectively permanently fixed to the engine and cell, and a third liaison assembly connecting said first and second assemblies, said second assembly having an axial passage therein, wherein said method comprises:
- positioning said engine vertically beneath said cell with said first assembly being vertically aligned;
- engaging a guide tube tool passing through said recess of said cell to a first element of said second assembly to rotationally lock said guide tube; utilizing a first spanner tool to introduce a first part of said liaison assembly through said guide tube and said axial passage, and to lock said first part of said liaison assembly between said first element of said second assembly and a shaft of said first assembly;
- tightening said first part of said liaison assembly on said shaft of said first assembly whereby said engine is raised toward said cell;
- utilizing a second spanner tool to introduce a second part of said liaison assembly through said guide tube and said axial passage, and to position one end of said second part of said liaison assembly over a rotational blocking portion of said shaft of said first assembly;
- utilizing said second spanner tool to introduce a locking part of said liaison assembly through said guide tube and locking said locking part to said first element of said second assembly with slight overtightening therebetween;
- withdrawing said second spanner tool and said guide tube tool; and
- utilizing an elastic element to block rotational movement between said locking part and said first part of said second assembly.

* * * * *